US011929479B2

(12) United States Patent
Yamashiro et al.

(10) Patent No.: US 11,929,479 B2
(45) Date of Patent: Mar. 12, 2024

(54) POWER SUPPLY DEVICE, VEHICLE HAVING SAME, AND BUFFER

(71) Applicant: SANYO Electric Co., Ltd., Osaka (JP)

(72) Inventors: Go Yamashiro, Hyogo (JP); Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 527 days.

(21) Appl. No.: 17/262,256

(22) PCT Filed: Jul. 26, 2019

(86) PCT No.: PCT/JP2019/029344
§ 371 (c)(1),
(2) Date: Jan. 22, 2021

(87) PCT Pub. No.: WO2020/026964
PCT Pub. Date: Feb. 6, 2020

(65) Prior Publication Data
US 2021/0351452 A1 Nov. 11, 2021

(30) Foreign Application Priority Data
Jul. 31, 2018 (JP) ................................ 2018-144541

(51) Int. Cl.
*B60K 1/04* (2019.01)
*H01M 10/613* (2014.01)
(Continued)

(52) U.S. Cl.
CPC ............. *H01M 10/653* (2015.04); *B60K 1/04* (2013.01); *H01M 10/613* (2015.04);
(Continued)

(58) Field of Classification Search
CPC ........... H01M 50/209; H01M 10/6554; H01M 10/647; H01M 50/291; B60K 1/04; B60K 1/02; Y02T 10/70
See application file for complete search history.

(56) References Cited

U.S. PATENT DOCUMENTS

2015/0068826 A1* 3/2015 Kimura .............. H01M 10/613 180/68.5
2015/0144409 A1* 5/2015 Fujii .................. H01M 50/519 429/121
2021/0203040 A1 7/2021 Okada et al.

FOREIGN PATENT DOCUMENTS

JP 2017-016799 1/2017
JP 2017-174831 A 9/2017
(Continued)

OTHER PUBLICATIONS

English Translation of Chinese Search Report dated Mar. 15, 2023, issued in counterpart CN application No. 201980050889.5. (3 pages).

(Continued)

*Primary Examiner* — Jason D Shanske
*Assistant Examiner* — James J Triggs
(74) *Attorney, Agent, or Firm* — WHDA, LLP

(57) ABSTRACT

Power supply device includes a plurality of secondary battery cells, a pair of end plates that cover both end faces of battery stack in which the plurality of secondary battery cells are stacked, a plurality of fastening members that fasten end plates to each other, a plurality of pressing parts that press upper surfaces of the plurality of secondary battery cells respectively, and buffer interposed between pressing parts and the upper surfaces of secondary battery cells. Buffer includes a plurality of covers made of resin, and a connecting part, having flexibility, for connecting two of the plurality of covers. Buffer is configured such that each of the
(Continued)

plurality of covers is disposed on the upper surface of corresponding one of secondary battery cells, and each of pressing part abuts on the upper surface of the corresponding cover.

13 Claims, 13 Drawing Sheets

(51) Int. Cl.

| | |
|---|---|
| ***H01M 10/647*** | (2014.01) |
| ***H01M 10/653*** | (2014.01) |
| ***H01M 10/6554*** | (2014.01) |
| ***H01M 50/209*** | (2021.01) |
| ***H01M 50/249*** | (2021.01) |
| ***H01M 50/264*** | (2021.01) |
| ***H01M 50/291*** | (2021.01) |
| ***H01M 50/293*** | (2021.01) |

(52) U.S. Cl.

CPC ..... *H01M 10/647* (2015.04); *H01M 10/6554* (2015.04); *H01M 50/209* (2021.01); *H01M 50/249* (2021.01); *H01M 50/264* (2021.01); *H01M 50/291* (2021.01); *H01M 50/293* (2021.01)

(56) References Cited

FOREIGN PATENT DOCUMENTS

| | | |
|---|---|---|
| WO | 2013/031614 A1 | 3/2013 |
| WO | 2017/130705 A1 | 8/2017 |

OTHER PUBLICATIONS

International Search Report of PCT application No. PCT/JP2019/029344 dated Oct. 29, 2019.

The Extended European Search Report dated Sep. 16, 2021, issued in counterpart EP Application No. 19844830.0. (28 pages).

* cited by examiner 100
15
15a
15d
15b
30
1
3
20
50

30
31
33
34
35
40

EV
98
100
Power supply device
95
DC/AC inverter
94
G
M
93
91
97
97

POWER SUPPLY DEVICE, VEHICLE HAVING SAME, AND BUFFER

CROSS-REFERENCE TO RELATED APPLICATIONS

This application is a U.S. national stage application of the PCT International Application No. PCT/JP2019/029344 filed on Jul. 26, 2019, which claims the benefit of foreign priority of Japanese patent application No. 2018-144541, filed on Jul. 31, 2018, the contents all of which are incorporated herein by reference.

TECHNICAL FIELD

The present invention relates to a power supply device, a vehicle having the same, and a buffer used in the power supply device.

BACKGROUND ART

A power supply device is used as a power supply device for driving a vehicle, a power supply device for storing electricity, or the like. Such a power supply device is preferably configured to be capable of outputting a large current, and includes a plurality of rechargeable and dischargeable secondary battery cells connected in series or in parallel. Moreover, in recent years, it has been desired to increase the capacity of a power supply device, and from the viewpoint of space efficiency, a power supply device having a battery stack in which secondary battery cells each having a square outer can are stacked is used (for example, PTL 1).

As shown in FIG. 16, such a power supply device adopts a configuration that in a state where a large number of power storage elements 901 are stacked, end plates 920 are disposed on both end faces, and end plates 920 are fastened to each other by bind bar 915. When power supply device 900 having this configuration is used for, for example, an in-vehicle application, there is a risk that the secondary battery cells may be displaced in the vertical direction due to vibration, impact, or the like. For this reason, a configuration is adopted in which the upper end of the bind bar is bent and pressed against the corner of the upper surface of the battery stack.

However, while the secondary battery cells expand and contract due to charging and discharging, the heights of the upper surfaces thereof are not necessarily constant between the secondary battery cells. As a result, there is a problem that while the height of the upper surface of the secondary battery cell is individual, in the configuration in which the upper surface of the battery stack is uniformly pressed, the stress applied to the upper surfaces of the secondary battery cells is uneven and cannot be made uniform. For example, when a relatively strong stress is applied to the upper surfaces of some secondary battery cells, it is considered that deterioration of those secondary battery cells progresses.

CITATION LIST

Patent Literature

PTL 1: Unexamined Japanese Patent Publication No. 2017-16799

SUMMARY OF THE INVENTION

The present invention has been made in view of such a background. One of the objects of the present invention is to provide a power supply device for dispersing a stress applied to the upper surfaces of secondary battery cells and protecting the secondary battery cells, a vehicle equipped with the same, and a buffer.

A power supply device according to an aspect of the present invention includes a plurality of secondary battery cells, a pair of end plates that covers both end faces of a battery stack in which the plurality of secondary battery cells are stacked, a plurality of fastening members that fasten the end plates to each other, a plurality of pressing parts that press upper surfaces of the plurality of secondary battery cells respectively, and a buffer interposed between the pressing parts and the upper surfaces of the secondary battery cells. The buffer includes a plurality of covers made of resin, and a connecting part, having flexibility, for connecting two of the plurality of covers. The buffer is configured such that each of the plurality of covers is disposed on the upper surface of corresponding one of the secondary battery cells, and the pressing part abuts on the upper surface of the cover.

According to the above configuration, the upper surface of each secondary battery cell is pressed by the pressing part to make the height uniform, and the stress applied to the pressing parts of the respective secondary battery cells can be dispersed by the buffer.

DESCRIPTION OF EMBODIMENTS

Figure 1:
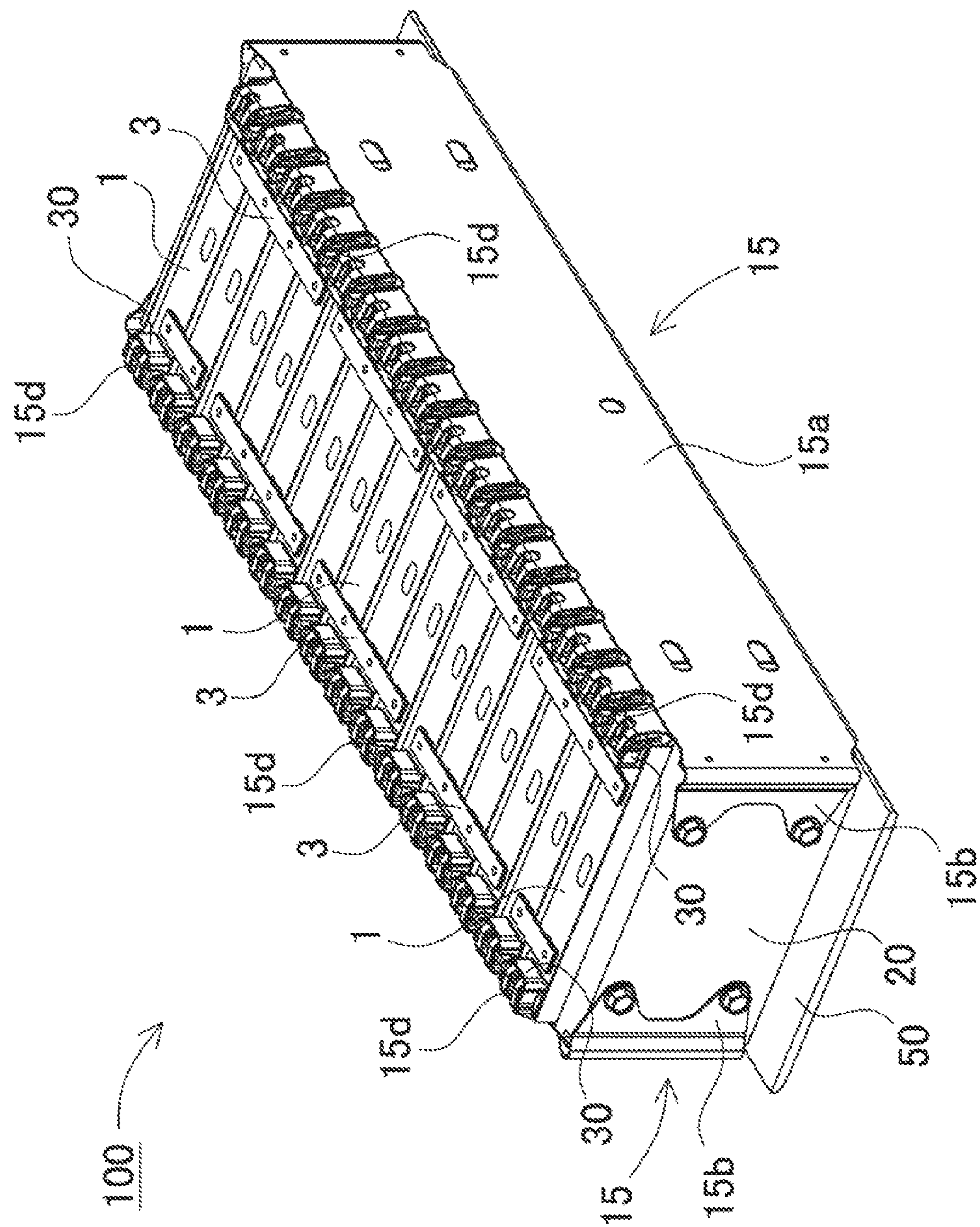
FIG. 1 is a perspective view showing a power supply device according to a first exemplary embodiment.

In a power supply device according to an exemplary embodiment of the present invention, the connecting part is bent in a U shape and is provided to the walls facing each other of the adjacent covers. With the above configuration, the U-shaped connecting part is elastically deformed, so that even if the adjacent secondary battery cells are displaced in the height direction, the height difference can be absorbed by the connecting part.

Further, in a power supply device according to another exemplary embodiment of the present invention, in the buffer, the covers and the connecting parts are integrally formed. By integrally forming the covers and the connecting parts with resin in this way, it is possible to connect the covers to each other while easily adding flexibility to the connecting part.

Further, in the power supply device according to another exemplary embodiment of the present invention, the buffer further includes a plate that is made of metal in a plate shape and is disposed on each cover, and the buffer is configured such that the plurality of covers are disposed on the upper surfaces of the secondary battery cells respectively, and each of the plurality of pressing parts abuts on the upper surface of the plate disposed on the cover. With the above configuration, when the pressing part presses the upper surface of each secondary battery cell, the pressing part abuts on the metal plate, so that the hardness of the portion exposed to a high stress can be increased to suppress deterioration of the buffer, and the stress can be further dispersed by the resin cover.

Furthermore, in the power supply device according to another exemplary embodiment of the present invention, the cover includes a wall so as to cover the periphery in a U-shape in a plan view, and the plate is disposed on the cover surrounded by the wall. With the above configuration, by surrounding the periphery of the cover on which the plate is disposed by the wall, it is possible to surround, by the wall, and protect the periphery of the pressing part that presses the cover. In particular, when the pressing part is made of metal, the adjacent pressing parts can be effectively insulated by the wall.

Furthermore, in the power supply device according to another exemplary embodiment of the present invention, the plate has one or more holes opened. With the above configuration, the plate can be easily positioned.

Furthermore, in the power supply device according to another exemplary embodiment of the present invention, the plate can be integrally molded with the cover. With the above configuration, the plate can be reliably fixed at a predetermined position of the cover.

Furthermore, in the power supply device according to another exemplary embodiment of the present invention, the plate can be insert-molded in the cover. With the above configuration, the load can be distributed by the metal plate.

Furthermore, in the power supply device according to another exemplary embodiment of the present invention, a portion where the pressing part abuts on the upper surface of the secondary battery cell is curved.

Furthermore, in the power supply device according to another exemplary embodiment of the present invention, the pressing part is integrally formed with the fastening member.

Furthermore, in the power supply device according to another exemplary embodiment of the present invention, the fastening member includes a fastening main surface in a flat plate shape, and the pressing part provided for each secondary battery cell on the upper end of the fastening main surface.

Furthermore, the power supply device according to another exemplary embodiment of the present invention includes a heat dissipation plate disposed on the bottom surface of the battery stack.

Furthermore, a vehicle according to another exemplary embodiment of the present invention includes the power supply device, motor for traveling to which electric power is supplied from the power supply device, a vehicle body on which the power supply device and the motor are mounted, and wheels that are driven by the motor to drive the vehicle body.

Furthermore, the power supply device according to another exemplary embodiment of the present invention is a buffer that covers the upper surface of a battery stack in which a plurality of secondary battery cells are stacked and is interposed between a pressing part that presses the upper surface of each secondary battery cell and the upper surface of the secondary battery cell. The buffer includes a plurality of covers made of resin, a plate made of metal in a plate shape disposed on each of the covers, and a connecting part, having flexibility, for connecting two of the plurality of covers. With the above configuration, the upper surface of each secondary battery cell can be pressed by the pressing part to make the height uniform, and the stress applied to the pressing part of each secondary battery cell can be dispersed by the buffer.

Exemplary embodiments of the present invention will be described below with reference to the drawings. However, the exemplary embodiments shown below are examples for embodying the technical idea of the present invention, and the present invention is not specified as those described below. Further, the present specification does not specify the members shown in the claims as the members of the exemplary embodiments. In particular, the dimensions, materials, shapes, relative arrangements, and the like of the components described in the exemplary embodiments are not intended to limit the scope of the present invention only to them, and are merely explanatory examples, unless otherwise specified. For example, the sizes and positional relationship of the members shown in each drawing may be exaggerated to clarify the explanation. Further, in the following description, members of the same or the same quality are denoted by the same name and reference numeral, and detailed description thereof will be omitted as appropriate. Further, each element constituting the present invention may be configured such that a plurality of elements are composed of the same member and the one member serves as the plurality of elements, or conversely, the function of one member can be shared and achieved by the plurality of members.

The power supply device according to the exemplary embodiment is used for various purposes such as a power supply that is mounted on an electrically driven vehicle such as a hybrid vehicle or an electric vehicle to supply electric power to a traveling motor, a power supply for storing generated power of natural energy such as solar power generation or wind power generation, or a power supply for storing midnight power, and is used as a power supply particularly suitable for high power and high current applications. In the following example, an exemplary embodiment applied to a power supply device for driving a vehicle will be described.

First Exemplary Embodiment

Figure 2:
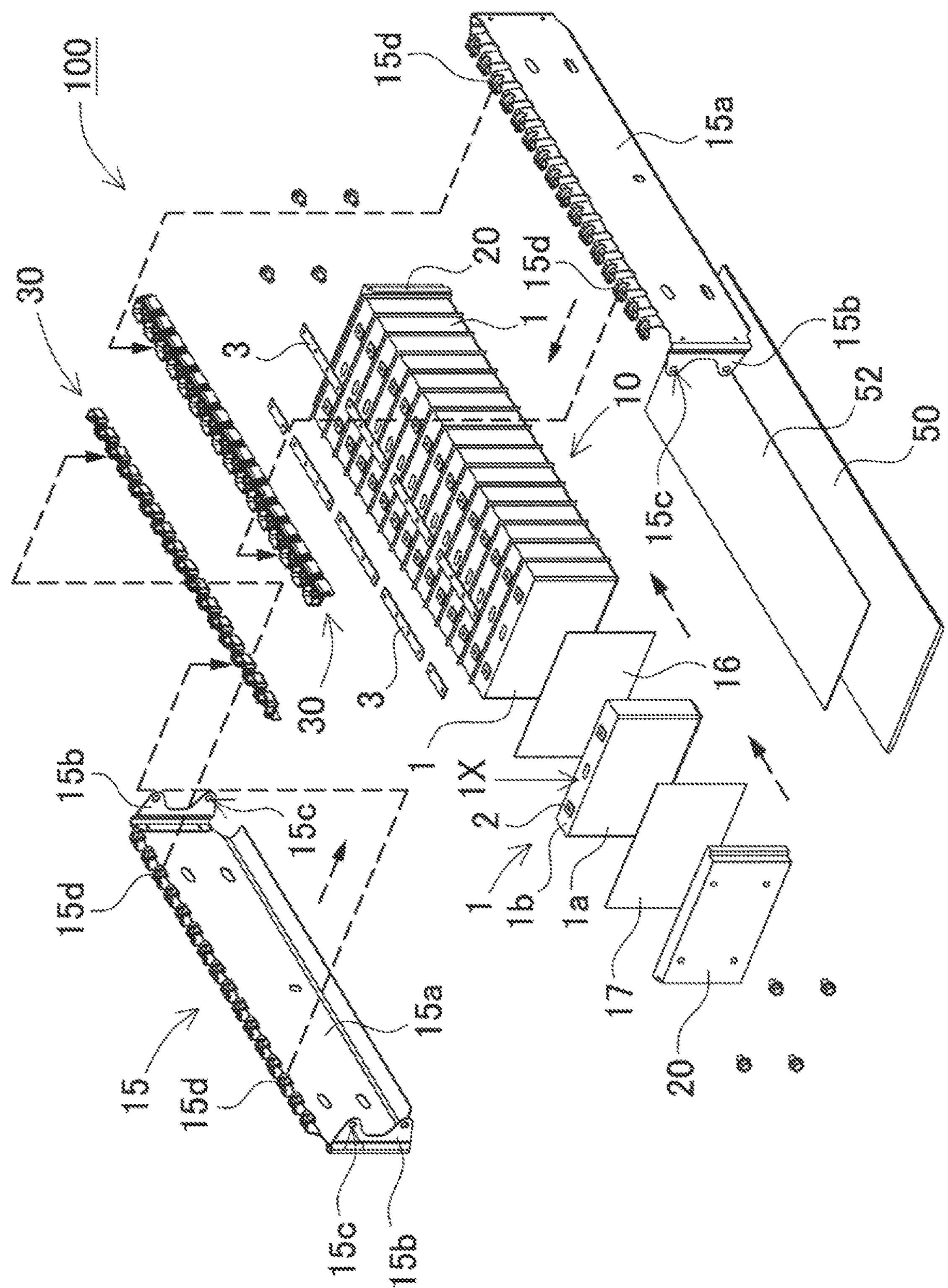
FIG. 2 is an exploded perspective view of the power supply device of FIG. 1.

FIG. 1 shows a perspective view of power supply device 100 according to a first exemplary embodiment of the present invention, and FIG. 2 shows an exploded perspective view thereof. Power supply device 100 shown in these figures includes battery stack 10 in which a plurality of secondary battery cells 1 are stacked, a pair of end plates 20 covering both end faces of battery stack 10, a plurality of fastening members 15 for fastening end plates 20, and buffer 30 disposed on the upper surface of secondary battery cell 1. Buffers 30 are disposed on the left and right shoulders of battery stack 10.

(Battery Stack 10)

Battery stack 10 includes the plurality of secondary battery cells 1 each having positive and negative electrode terminals 2, and bus bars 3 that are connected to electrode terminals 2 of the plurality of secondary battery cells 1 to connect the plurality of secondary battery cells 1 in parallel and in series. The plurality of secondary battery cells 1 are connected in parallel and in series via these bus bars 3. Secondary battery cell 1 is a rechargeable secondary battery. In power supply device 100, a plurality of secondary battery cells 1 are connected in parallel to form a parallel battery group, and a plurality of parallel battery groups are connected in series so that a large number of secondary battery cells 1 are connected in parallel and in series. In power supply device 100 shown in FIGS. 1 and 2, a plurality of secondary battery cells 1 are stacked to form battery stack 10. Further, a pair of end plates 20 are disposed on both end faces of battery stack 10. The ends of fastening members 15 are fixed to end plates 20, whereby secondary battery cells 1 in a stacked state are fixed in a pressurized state.

(Secondary Battery Cell 1)

Secondary battery cell 1 is a square battery having a quadrangular outer shape on the main surface that is a wide surface, and the thickness is smaller than the width. Moreover, secondary battery cell 1 is a secondary battery that can be charged and discharged, and is a lithium ion secondary battery. However, the present invention does not specify the secondary battery cell as a square battery, nor does it specify a lithium ion secondary battery. As the secondary battery cell, all rechargeable batteries, for example, a non-aqueous electrolyte secondary battery other than the lithium ion secondary battery, a nickel hydrogen secondary battery cell, and the like can also be used.

As shown in FIG. 2, in secondary battery cell 1, an electrode body in which positive and negative electrode plates are layered is housed in outer can 1*a*, and outer can 1*a* is filled with an electrolytic solution and airtightly sealed. Outer can 1*a* is formed in a square cylindrical shape with the bottom being closed, and the opening of the upper side of outer can 1*a* is airtightly closed by sealing plate 1*b* that is a metal plate. Outer can 1*a* is manufactured by deep drawing a metal plate such as aluminum or aluminum alloy. Like outer can 1*a*, sealing plate 1*b* is made of a metal plate such as aluminum or aluminum alloy. Sealing plate 1*b* is inserted into the opening of outer can 1*a*, and the boundary between the outer periphery of sealing plate 1*b* and the inner circumference of outer can 1*a* is irradiated with a laser beam, whereby sealing plate 1*b* is fixed airtightly to outer can 1*a* through laser welding.

(Electrode Terminal 2)

In secondary battery cell 1, sealing plate 1*b* that is a top surface is used as a terminal surface, and positive and negative electrode terminals 2 are fixed to both ends of the terminal surface. Electrode terminal 2 has a columnar protrusion. However, the protrusion does not necessarily have to be cylindrical, and may be polygonal or elliptical.

Positive and negative electrode terminals 2, fixed to sealing plate 1*b* of secondary battery cell 1, are positioned such that the positive electrode and the negative electrode are symmetrical in left and right. As a result, secondary battery cells 1 are inversed in right and left and stacked, and electrode terminals 2 of the positive electrode and the negative electrode that are adjacent to each other are connected by bus bar 3, whereby adjacent secondary battery cells 1 can be connected in series.

(Battery Stack 10)

The plurality of secondary battery cells 1 are stacked such that the thickness direction of each secondary battery cell 1 becomes the stacking direction to form battery stack 10. In battery stack 10, the plurality of secondary battery cells 1 are stacked such that the terminal surfaces on which positive and negative electrode terminals 2 are provided, or sealing plates 1*b* in FIG. 2, are flush with each other.

Battery stack 10 may have insulating spacer 16 interposed between secondary battery cells 1 stacked adjacent to each other. Insulating spacer 16 is made of an insulating material such as resin in the form of a thin plate or a sheet. Insulating spacer 16 has a plate shape having a size substantially equal to the facing surface of secondary battery cell 1. Insulating spacer 16, stacked between adjacent secondary battery cells 1, can insulate secondary battery cells 1 adjacent to each other from each other. As a spacer disposed between adjacent secondary battery cells 1, a spacer having a shape in which a flow path for a cooling gas is formed between secondary battery cell 1 and the spacer can also be used. Further, the surface of secondary battery cell 1 can be covered with an insulating material. For example, the surface of the outer can excluding the electrode portion of the secondary battery cell may be heat-welded with a shrink tube such as PET resin. In this case, the insulating spacer may be omitted. Further, in a power supply device in which a plurality of secondary battery cells are connected in multiple parallel and multiple series, the secondary battery cells connected in series are insulated by an insulating spacer interposed between the secondary battery cells. Meanwhile, in the secondary battery cells connected in parallel with each other, since there is no voltage difference between the adjacent outer cans of the secondary battery cells, an insulating spacer between the secondary battery cells can be omitted.

Further, in power supply device 100 shown in FIG. 2, end plates 20 are disposed on both end surfaces of battery stack 10. End face spacer 17 may be interposed between the end plate and the battery stack to insulate them. End face spacer 17 can also be manufactured in the form of a thin plate or a sheet with an insulating material such as resin.

In battery stack 10, metal bus bar 3 is connected to positive and negative electrode terminals 2 of adjacent secondary battery cells 1, and the plurality of secondary battery cells 1 are connected in parallel and in series via bus bar 3. In battery stack 10, in the plurality of secondary battery cells 1 that are connected in parallel to each other to form a parallel battery group, the plurality of secondary battery cells 1 are stacked such that positive and negative electrode terminals 2 provided at both ends of terminal surface 1X are oriented in the same direction in left and right, while in secondary battery cells 1 that form a parallel battery group in which secondary battery cells 1 are stacked and connected in series with each other, the plurality of secondary battery cells 1 are stacked such that positive and negative electrode terminals 2 provided at both ends of terminal surface 1X are oriented in opposite directions in left and right. Here, in power supply device 100 according to the first exemplary embodiment shown in FIGS. 1 to 2, sixteen secondary battery cells 1 are stacked in the thickness direction to form battery stack 10 in which two secondary battery cells 1 are connected in parallel to form a parallel battery group, and eight sets of parallel battery groups are connected in series. Thereby, sixteen secondary battery cells 1 are connected in two parallel and eight series. Therefore, in battery stack 10 shown in FIG. 2, two secondary battery cells 1 constituting a parallel battery group are stacked such that positive and negative electrode terminals 2 are oriented in the same direction in left and right, and eight sets of parallel battery groups each consisting of two secondary battery cells 1 stacked to be oriented in the same direction are stacked such that positive and negative electrode terminals 2 are alternately oriented in opposite directions. However, the present invention does not specify a number of secondary battery cells constituting the battery stack and the connection state thereof. The number of secondary battery cells constituting the battery stack and the connection state thereof can be variously changed, including other exemplary embodiments described later.

In power supply device 100 according to the exemplary embodiment, in battery stack 10 in which the plurality of secondary battery cells 1 are stacked on each other, electrode terminals 2 of the plurality of secondary battery cells 1 adjacent to each other are connected to each other by bus bar 3, and the plurality of secondary battery cells 1 are connected in parallel and in series. Further, a bus bar holder may be disposed between battery stack 10 and bus bar 3. By using a bus bar holder, a plurality of bus bars can be disposed at a fixed position on the upper surface of the battery stack while insulating the plurality of bus bars from each other and insulating the terminal surface of the secondary battery cell from the bus bar.

(Bus Bar 3)

Bus bar 3 is manufactured by cutting and processing a metal plate into a predetermined shape. For the metal plate forming bus bar 3, a metal having low electric resistance and lightweight, such as an aluminum plate or a copper plate, or an alloy thereof can be used. However, for the metal plate of bus bar 3, other metals or their alloys, having low electric resistance and lightweight, can also be used.

(End Plate 20)

As shown in FIGS. 1 and 2, end plates 20 are disposed at both ends of battery stack 10 and are fastened via a pair of left and right fastening members 15 disposed along both side surfaces of battery stack 10. End plates 20 are disposed at both ends in the stacking direction of secondary battery cells 1 of battery stack 10 outside end face spacer 17 to sandwich battery stack 10 from both ends.

(Fastening Member 15)

Both ends of fastening member 15 are fixed to end plates 20 disposed on both end faces of battery stack 10. End plates 20 are fixed by a plurality of fastening members 15, and battery stack 10 is fastened in the stacking direction. Fastening member 15 is a metal plate having a predetermined width and a predetermined thickness along the upper surface of battery stack 10, and is disposed so as to face the upper and lower surfaces of battery stack 10. A metal plate such as iron, preferably a steel plate, can be used for fastening member 15. Fastening member 15 made of a metal plate is bent by press forming or the like and is formed in a predetermined shape. Further, both ends of fastening main surface 15*a* constituting plate-shaped fastening member 15 are bent to form bent portions 15*b*, and each bent portion 15*b* has through hole 15*c* opened. Fastening members 15 are disposed on opposite surfaces of battery stack 10, respectively, and are fastened to end plate 20 with bolts via through holes 15*c*.

(Pressing Part 15*d*)

Figure 3:
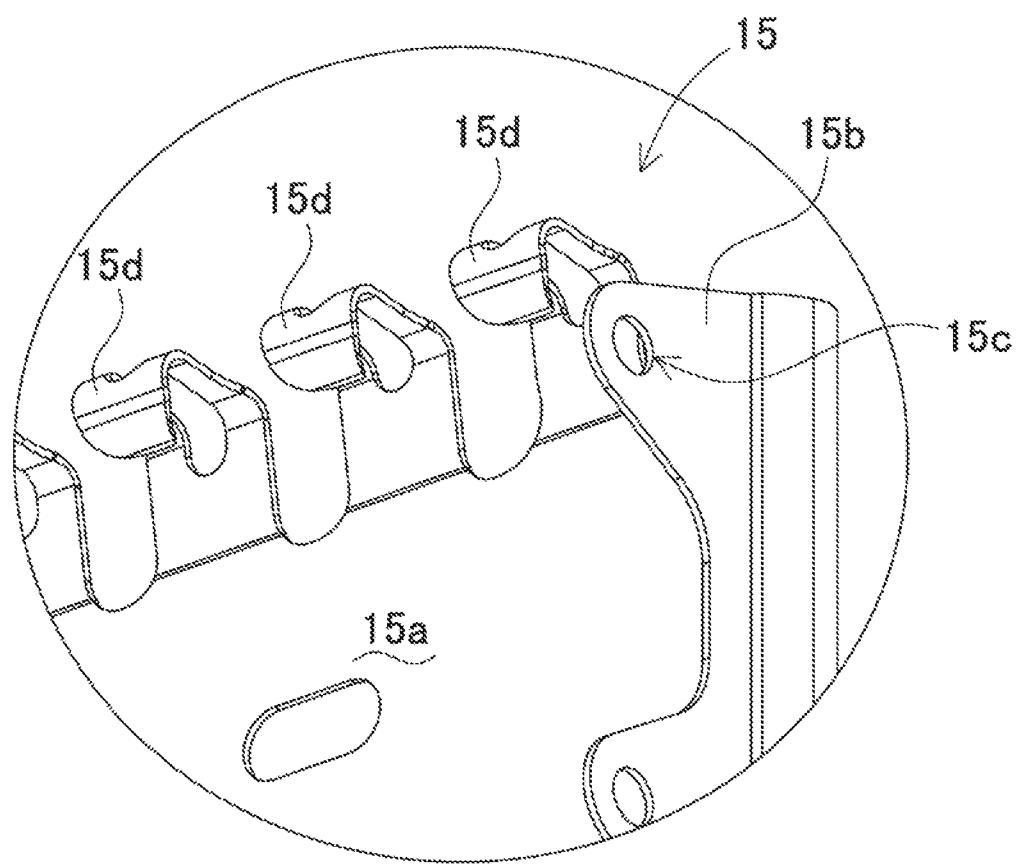
FIG. 3 is an enlarged perspective view showing a pressing part of FIG. 2.

Power supply device 100 also includes a plurality of pressing parts 15*d* for pressing the upper surfaces of the plurality of secondary battery cells 1. Pressing part 15*d* is configured such that a plurality of pressing parts 15*d* can independently perform pressing operation so as to be able to press the plurality of secondary battery cells 1 individually. Specifically, as shown in FIGS. 2, 3, and the like, adjacent pressing parts 15*d* are separated by space GP so as to be separated from each other. The interval at which a plurality of pressing parts 15*d* are provided is designed according to the thickness of secondary battery cell 1 and thickness of insulating spacer 16 interposed between them such that pressing part 15*d* is located on the upper surface of each secondary battery cell 1 in battery stack 10 in which secondary battery cells 1 are stacked.

As shown in FIG. 3, pressing part 15*d* has a curved portion that abuts on the upper surface of secondary battery cell 1. In this way, by making the folded surface facing secondary battery cell 1 (or buffer 30 described later) not flat but curved, the contact portion is in a linear shape or dot shape instead of a planar shape, whereby it is possible to achieve stable operation. On the other hand, since the contact portion is in a linear shape or dot shape, there is a concern that a stress will be concentrated and the surface pressure will increase. Therefore, plate 40 having high strength such as a metal plate is used for the abutting portion (details will be described later).

In the example shown in FIG. 2, pressing part 15*d* is integrally formed with fastening member 15. Here, fastening member 15 includes flat-shaped fastening main surface 15*a* and pressing part 15*d* provided at the upper end of fastening main surface 15*a*. As a result, the upper surface of each secondary battery cell 1 can be pressed by pressing part 15*d* in a state where battery stack 10 is fastened by fastening member 15. However, the present invention is not limited to the example in which the pressing part is integrally formed with the fastening member, and they may be formed of separate members.

(Buffer 30)

Figure 4:
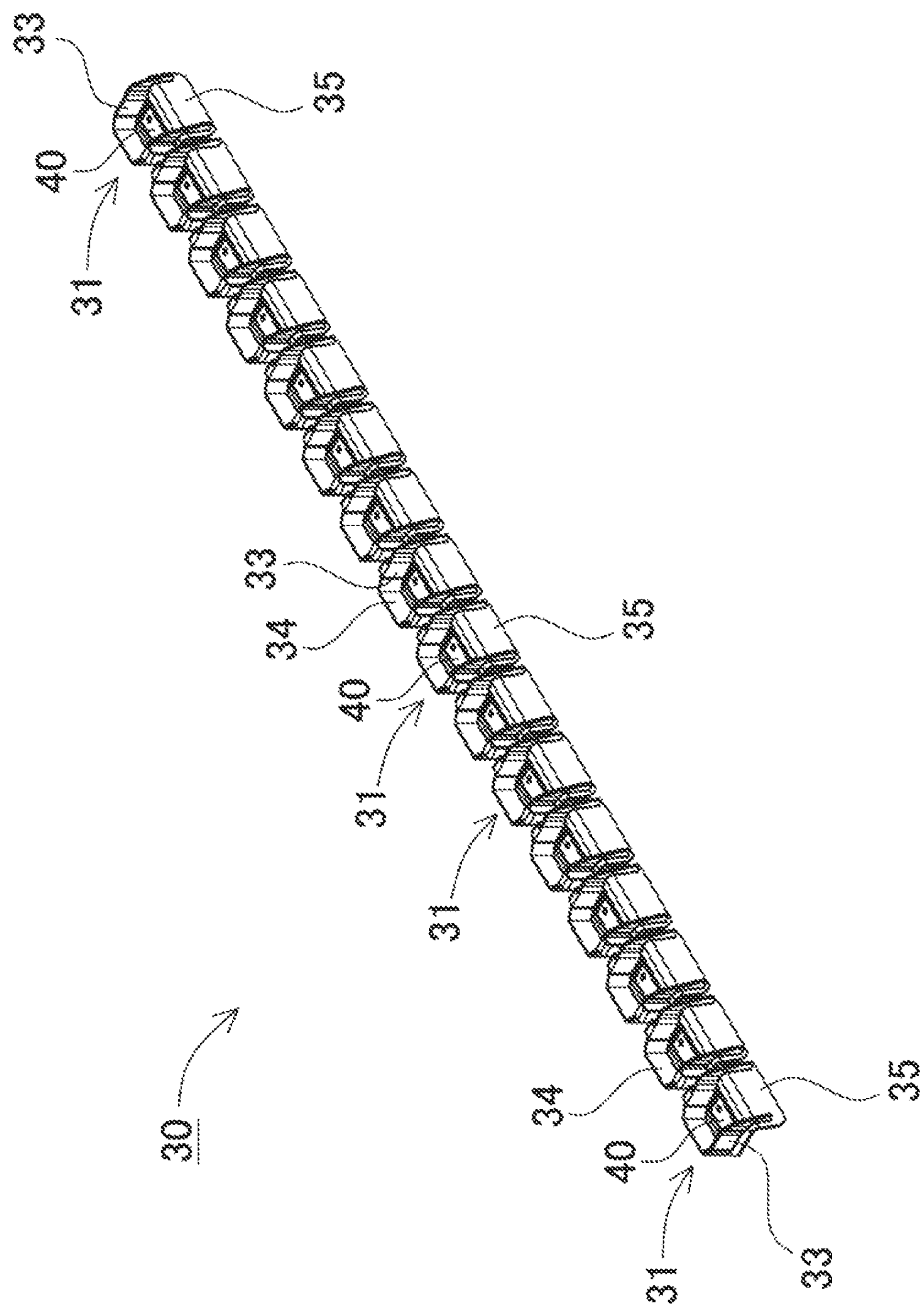
FIG. 4 is an enlarged perspective view of a main part of the buffer of FIG. 2.
Figure 5:
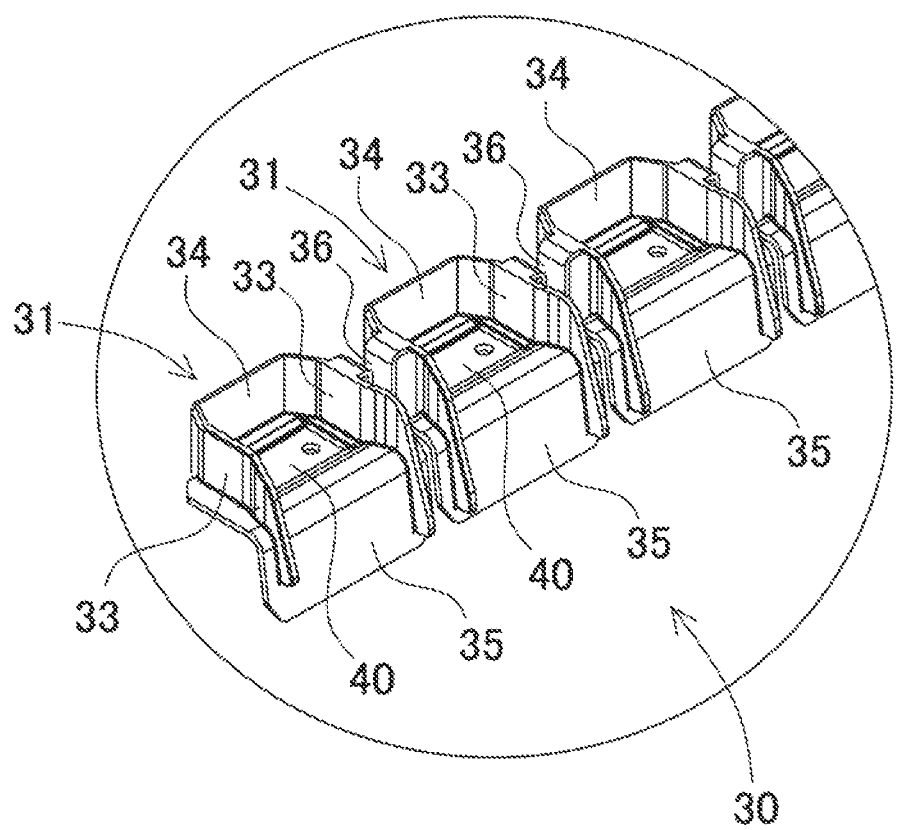
FIG. 5 is an enlarged perspective view of a main part of the buffer of FIG. 4 as viewed from diagonally above.
Figure 6:
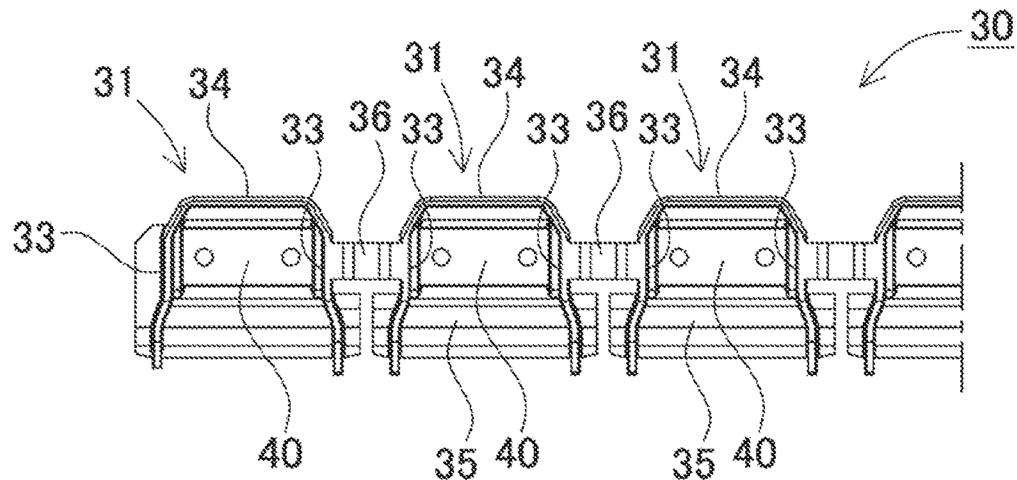
FIG. 6 is an enlarged plan view of a main part of the buffer of FIG. 2.
Figure 7:
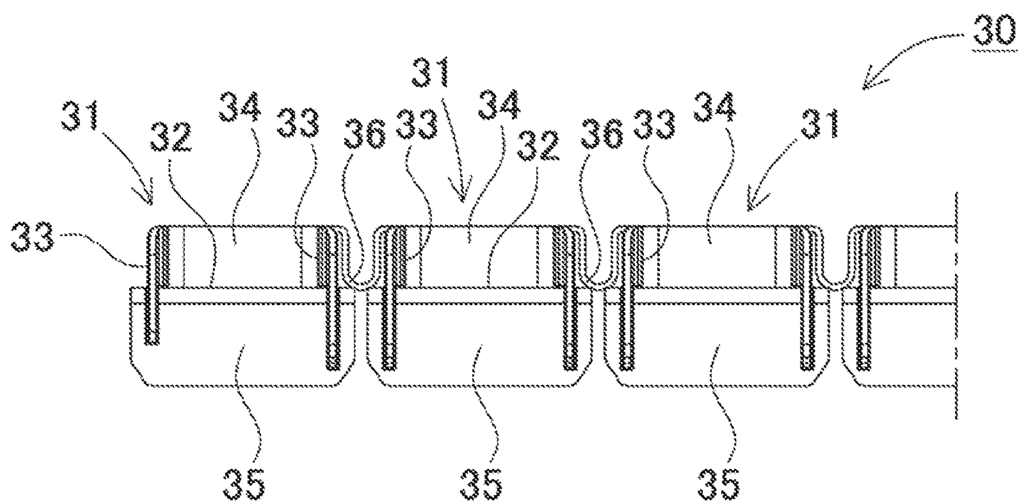
FIG. 7 is an enlarged side view of a main part of the buffer of FIG. 2.
Figure 8:
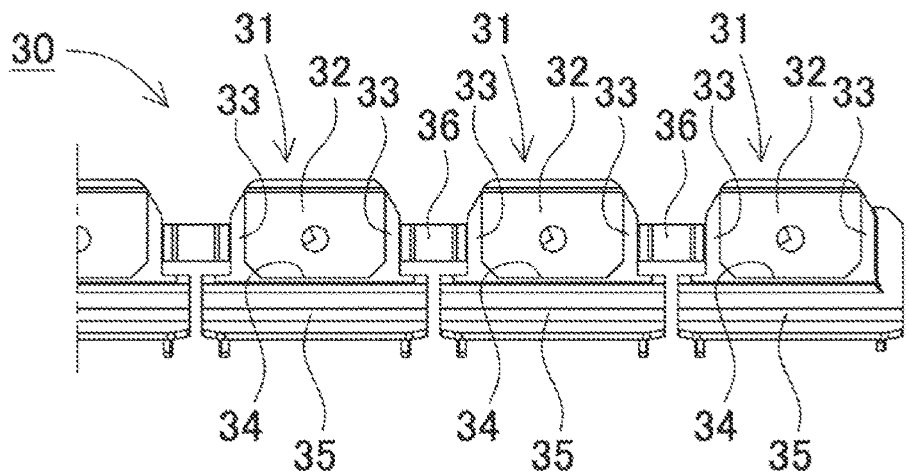
FIG. 8 is an enlarged bottom view of a main part of the buffer of FIG. 2.
Figure 9:
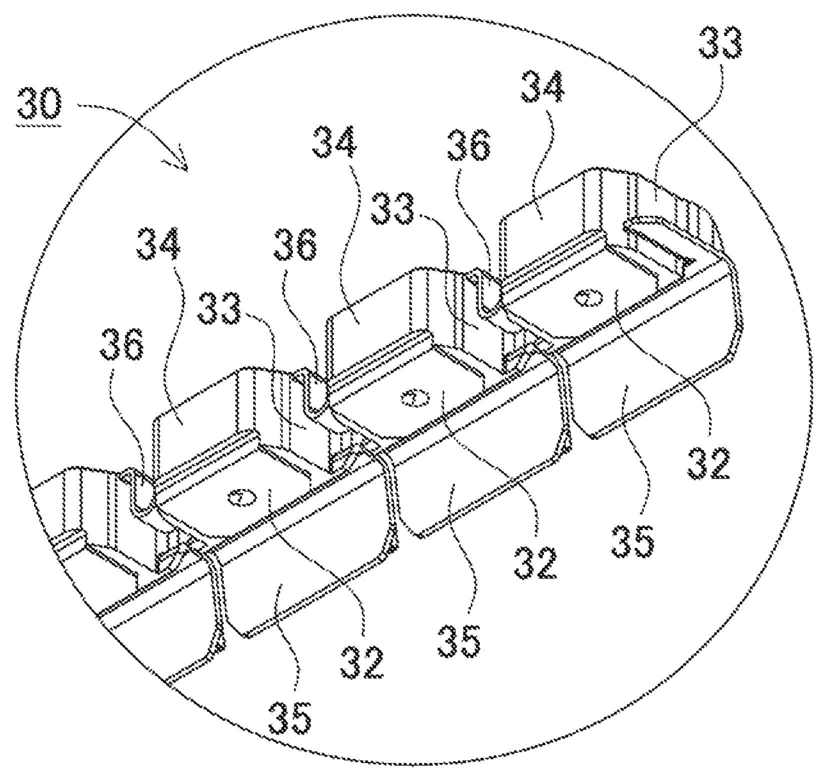
FIG. 9 is an enlarged perspective view of a main part of the buffer of FIG. 2 as viewed from diagonally below.

Buffer 30 is interposed between pressing part 15*d* and the upper surface of secondary battery cell 1. FIG. 4 shows a perspective view of buffer 30, FIG. 5 shows an enlarged perspective view of the main part viewed from diagonally above, FIG. 6 shows an enlarged plan view of the main part, FIG. 7 shows an enlarged side view of the main part, FIG. 8 shows an enlarged bottom view of the main part, and FIG. 9 shows an enlarged perspective view of the main part as viewed from diagonally below. Buffer 30 shown in these figures includes a plurality of covers 31 and connecting part 36 that connects adjacent covers 31 to each other. Connecting parts 36 are flexible so that each connecting part 36 can be individually moved in the height direction (vertical direction in FIG. 10).

Each cover 31 is composed of a member having an insulating property. Preferably, cover 31 is made of resin. For example, thermoplastic resin such as PPS, polypropylene, nylon, PET, polyvinylidene chloride, or polyvinylidene fluoride, thermosetting resin such as polyimide, fluororesin, PDAP, silicon resin, or epoxy resin, or the like can be preferably used. Further, by integrally forming covers 31 and connecting part 36 with use of resin, it is possible to connect covers 31 with each other while easily adding flexibility to connecting part 36.

Figure 11:
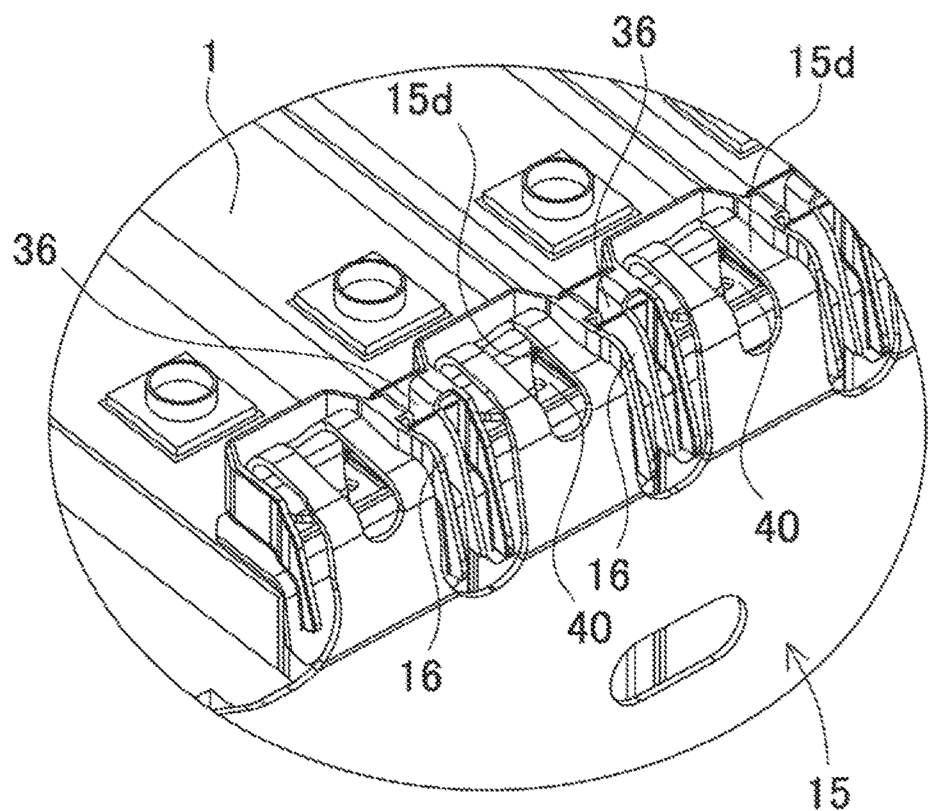
FIG. 11 is an enlarged perspective view of a main part of a power supply device according to a modified example.
Figure 12:
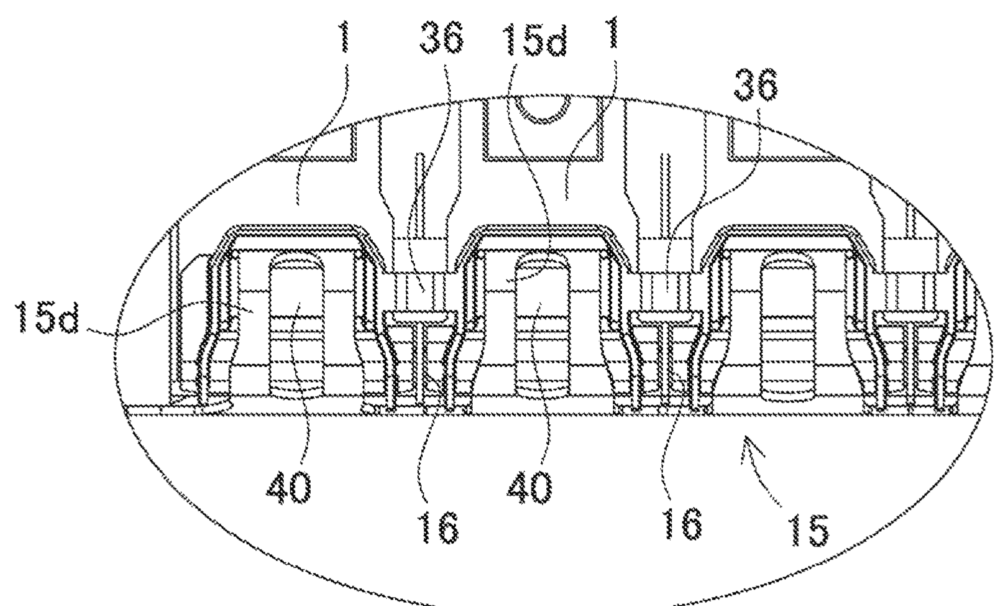
FIG. 12 is an enlarged plan view of a main part of a power supply device according to the modified example.

As shown in FIGS. 5 to 7, each cover 31 has bottom plate 32 that abuts on the upper surface of secondary battery cell 1, and wall 33 that is provided so as to surround the upper surface of bottom plate 32. Wall 33 is provided on a surface facing adjacent cover 31. In adjacent covers 31, opposing walls 33 are connected to each other by connecting part 36, and the plurality of covers 31 are continuously connected to each other, but relative movement of adjacent covers 31 can be achieved by giving flexibility to connection part 36. Preferably, in each cover 31, walls 33 facing each other on the left and right sides are connected by connecting wall 34. Further, wall 33 does not completely surround bottom plate 32 but opens one surface. Therefore, as shown in FIGS. 11 and 12, pressing part 15*d* is guided from the open end, and bottom plate 32 can be pressed by pressing part 15*d*. Wall 33 is formed in a U-shape in a top view as shown in FIGS. 5, 6, and the like.

As shown in FIGS. 5 to 9, connecting part 36 is provided so as to connect opposing walls 33 of adjacent covers 31 to each other. The connecting part 36 is bent in a U shape. With this configuration, U-shaped connecting part 36 is elastically deformed, so that even if adjacent secondary battery cells 1 are displaced in the height direction, the height difference can be absorbed by connecting part 36.

In addition, insulating spacer 16 can be positioned by using connecting part 36 and wall 33. For example, with a configuration that locks with connecting part 36 being provided at the edge of insulating spacer 16, when buffer 30 is provided to battery stack 10, by performing positioning between insulating spacer 16 inserted between secondary battery cells 1 and connecting part 36, positioning may also be performed such that each cover 31 is positioned on the upper surface of each secondary battery cell 1. For example, in power supply device 200 according to a modified example shown in FIGS. 11 and 12, a corner portion of insulating spacer 16 is projected so as to be locked to the outside of U-shaped connecting part 36. Further, for such positioning, not only connecting part 36 but also wall 33 can be used. In this way, positioning of battery stack 10 and cover 31 can be performed smoothly with use of connecting part 36 and wall 33.

Further, as shown in FIGS. 5, 7, 9, and the like, each cover 31 includes bent piece 35 that is bent downward so as to be continued from bottom plate 32 at the opening end. As shown in FIG. 2 and the like, buffers 30 are disposed on the left and right shoulders on the upper surface of battery stack 10. Further, in the example of FIG. 2 and the like, pressing part 15*d* is fixed to the upper end of fastening main surface 15*a* of fastening member 15. When a conductor such as a metal plate is used for fastening member 15, it is necessary to insulate between battery stack 10 and fastening member 15. Therefore, with bent piece 35 being provided, buffer 30 can insulate between a side surface of battery stack 10 and pressing part 15*d* or fastening main surface 15*a*. Bent piece 35 is integrally formed with bottom plate 32.

(Pressing Configuration for Each Secondary Battery Cell)

Figure 10:
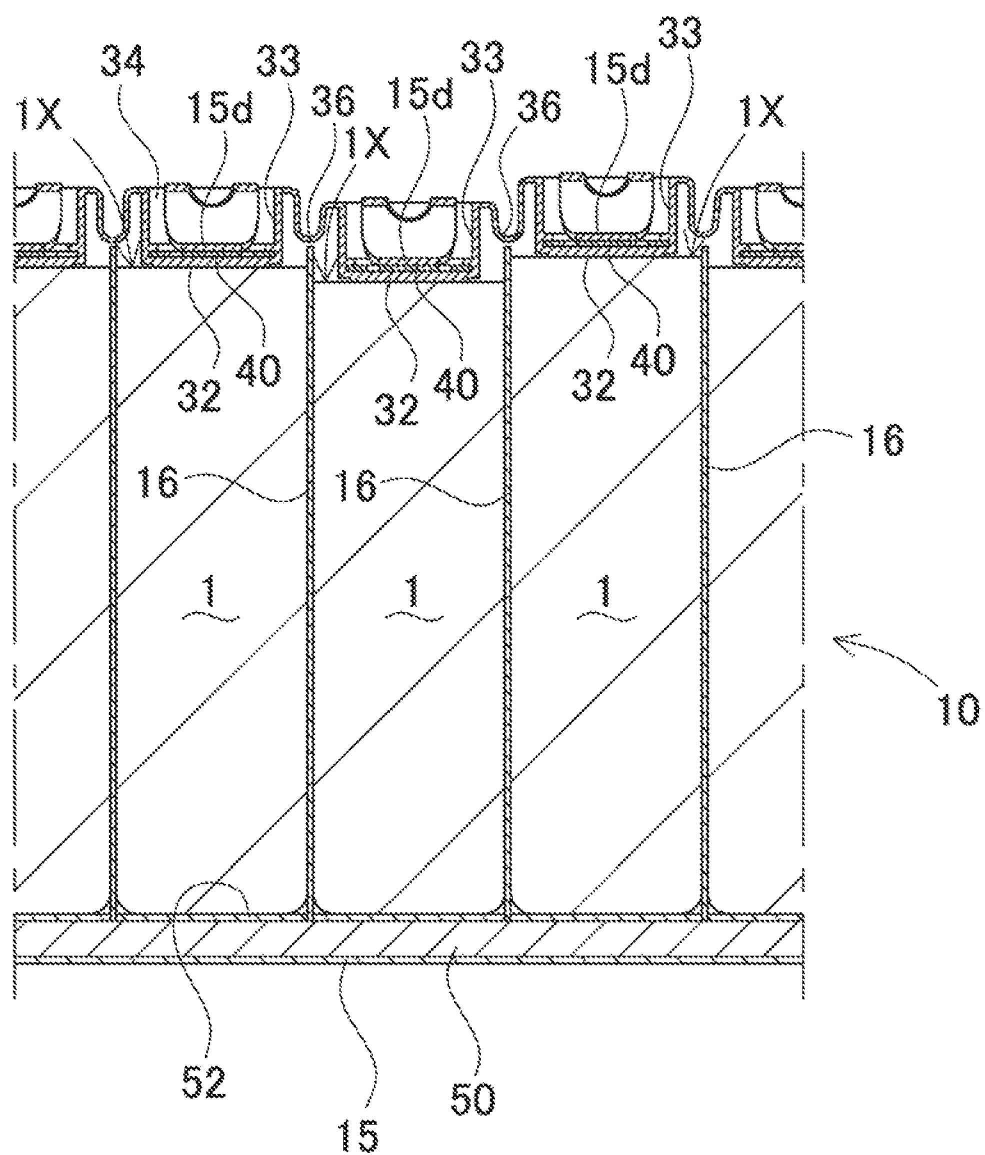
FIG. 10 is a schematic vertical cross-sectional view illustrating a function of the buffer of the power supply device of FIG. 1.

As shown in the cross-sectional view of FIG. 10, even if a relative positional displacement occurs in the height direction between adjacent secondary battery cells 1, buffer 30 and pressing part 15*d* absorb the positional displacement. In the example of FIG. 10, the positional displacement between secondary battery cells 1 is exaggerated for explanation. Each secondary battery cell 1 repeats expansion and contraction by charging and discharging. As a result, the height of secondary battery cell 1 is not constant and may differ from cell to cell. In addition, the upper surface of secondary battery cell 1 (here, terminal surface 1X) may not be on the same plane between the cells due to the manufacturing tolerance of the secondary battery cell, the vertical positional displacement at the time of fastening the secondary battery cell, and the like. Even in that case, a structure for holding the secondary battery cell is required such that the secondary battery cell does not move in the vertical direction when the power supply device is exposed to vibration or shock. At that time, if an attempt is made to press the upper surface of the battery stack in which the secondary battery cells are stacked with constant force as a whole, the stress applied to each secondary battery cell changes depending on the position in the height direction between the secondary battery cells, which is not preferable. For example, a secondary battery cell displaced upward is pressed with a high stress, while a secondary battery cell displaced downward is pressed with a relatively weak stress. If the pressing force applied to the terminal surface of each secondary battery cell becomes uneven as described above, it is considered that the degree of deterioration of the secondary battery cell may be different, and a drop of power or damage may occur due to aged deterioration.

Therefore, in the present embodiment, it is intended to achieve uniformity by suppressing a situation in which a difference is caused in the stress acting on the pressed surface while pressing the upper surface of each secondary battery cell and maintaining a state where pressing is performed with the same stress as a whole to thereby improve the reliability of the power supply device.

Specifically, as buffer 30, cover 31 that can move up and down is provided for each secondary battery cell 1. Cover 31 is disposed on the upper surface (terminal surface 1X) of each secondary battery cell 1, and adjacent covers 31 are connected to each other by connecting part 36. By giving flexibility to connecting part 36, cover 31 can move up and down independently, and can move according to the height of the upper surface of secondary battery cell 1 as shown in FIG. 10.

Further, pressing parts 15*d* that press covers 31 are also separated from each other such that the pressing pressure can be changed for each secondary battery cell 1 in the same manner. That is, instead of pressing the upper surfaces of all secondary battery cells with the same stress, the stress is applied individually according to the heights of the upper surfaces of secondary battery cells 1 by separating each secondary battery cell. As a result, non-uniform stress can be suppressed.

In the example shown in FIG. 4, description has been given on a configuration in which a series of buffers 30 having a plurality of covers 31 connected by connecting parts 36 are configured, and one buffer is provided on each of the left and right sides of the upper surface of battery stack 10 as shown in FIG. 2. With this configuration, a series of covers 31 can be collectively disposed on battery stack 10. This provides an advantage of improving workability during assembly. However, the present invention is not limited to the configuration in which all covers 31 are connected. For example, the present invention may have a configuration in which a plurality of buffers, having a certain number of connected covers, are disposed to be connected in series. For example, a buffer in which covers are connected in small units such as two or three may be prepared, and a total number of covers can be increased or decreased by a number of connected buffers. With this method, there is an advantage that a buffer can be shared even by battery stacks having different numbers of secondary battery cells.

(Plate 40)

In addition, plate 40 in a plate shape can be provided to each cover 31. In the examples of FIGS. 5 and 6, plate 40 is disposed on bottom plate 32. Plate 40 is made of a material having sufficient strength, preferably a metal plate, for example, made of SUS. In this way, since plate 40 is not entirely made of resin and high-strength plate 40 such as a metal plate is provided to a portion directly receiving the stress of pressing part 15*d*, it is possible to suppress deterioration and settling due to compression of cover 31. If the pressing part is brought into direct contact with the resin cover, there is a concern that it will creep by high surface pressure. Therefore, such creep can be effectively avoided by using a metal plate. Furthermore, since the entire plate is not a metal plate, but metal plate 40 is placed at a portion that comes into contact with the pressing part and pressing part 15*d* abuts on metal plate 40, the hardness of the portion exposed to high stress can be increased to thereby suppress deterioration of buffer 30, and the surface pressure can be dispersed over entire cover 31. Further, an effect of insulating conductive plate 40 such as a metal plate from secondary battery cell 1 and the like by resin cover 31 can also be obtained.

Plate 40 is fixed to cover 31 by being stuck or embedded. For example, it is formed by integral molding through insert molding. In the case of insert molding, since the plate to be inserted is generally configured to be sandwiched by a mold, a hole is formed in the bottom plate of the cover. In order to improve the insulating properties of the metal plate, it is preferable not to form a hole in the cover. For this reason, when insert molding is performed by injection molding, the plate is pressed by the injection pressure of resin so that molding can be performed without opening a hole in the cover.

Further, plate 40 may have one or more holes as shown in FIGS. 5 and 6. By using the hole, it is possible to facilitate positioning when plate 40 is disposed on cover 31.

(Heat Dissipation Plate 50)

Heat dissipation plate 50 can be disposed on the bottom surface of battery stack 10. Heat dissipation plate 50 is fixed to the bottom surface of battery stack 10 in a thermal coupling state. As a result, battery stack 10 can dissipate heat from its bottom surface. Heat dissipation plate 50 is made of metal having excellent thermal conductivity. Further, a heat conductive paste may be applied or heat conductive sheet 52 may be interposed between heat dissipation plate 50 and the bottom surface of battery stack 10 to thereby establish a preferable thermal coupling state. As heat conductive sheet 52, a member that maintains heat conductivity while having insulating properties, for example, a silicone resin or the like can be used. Further, heat dissipation plate 50 may be provided with radiation fins or the like. Furthermore, a cooling function may be added to heat dissipation plate 50. For example, a refrigerant passage is provided inside the heat dissipation plate, and cooling refrigerant is allowed to circulate the refrigerant passage to cool.

The power supply device described above can be used as an on-vehicle power supply. As a vehicle equipped with the power supply device, an electrically driven vehicle such as a hybrid vehicle or a plug-in hybrid vehicle that runs with both an engine and a motor, or an electric vehicle that runs only with a motor can be used, and is used as a power supply for these vehicles. In addition, description will be given on an example of constructing a large-capacity, high-output power supply device 100 in which a large number of the above-mentioned power supply devices are connected in series or in parallel, and a necessary control circuit is further added, in order to obtain the electric power for driving a vehicle.

(Power Supply Device for Hybrid Vehicle)

Figure 13:
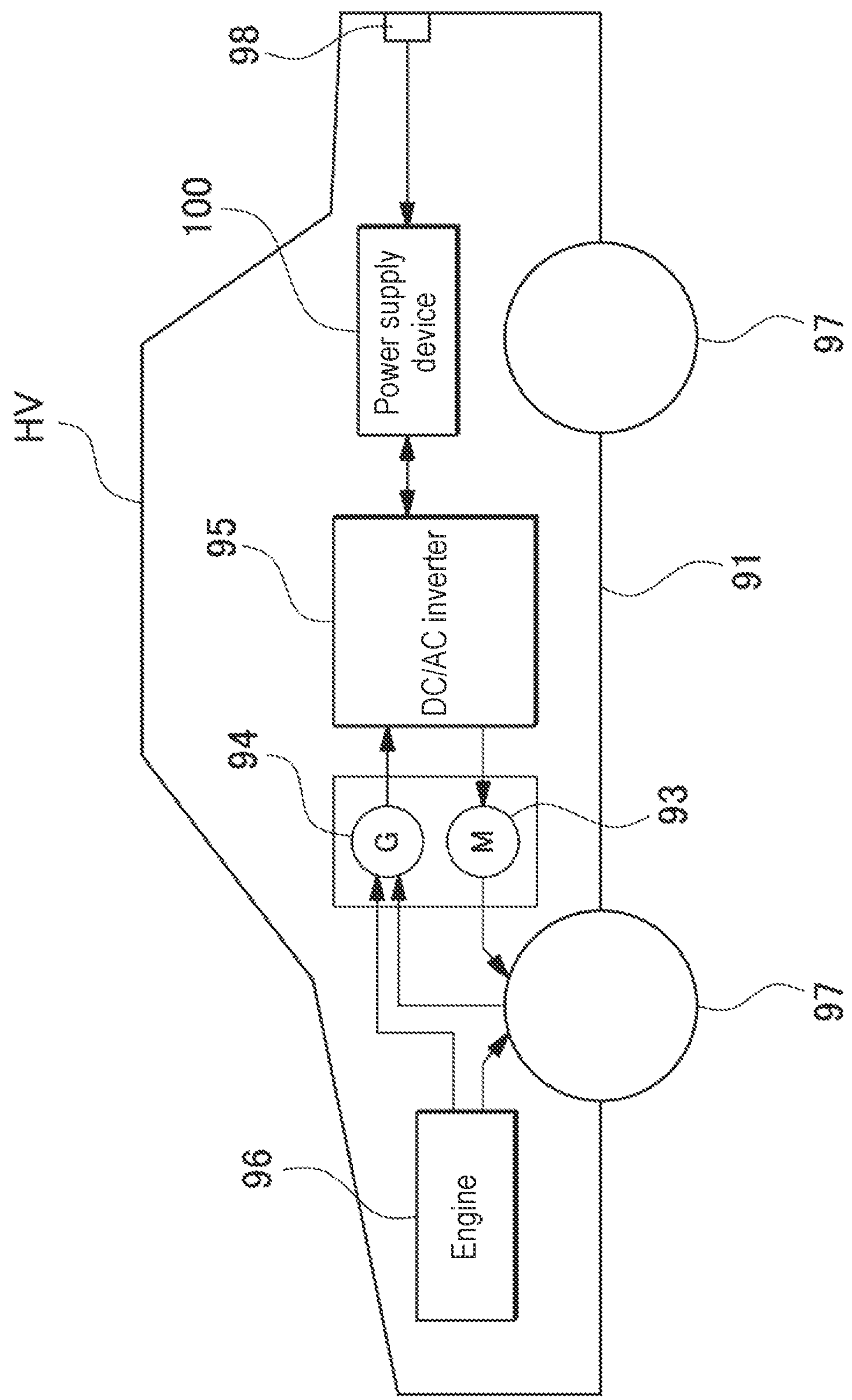
FIG. 13 is a block diagram showing an example in which the power supply device is mounted on a hybrid vehicle that travels by an engine and a motor.

FIG. 13 shows an example in which the power supply device is mounted on a hybrid vehicle that runs by both an engine and a motor. Vehicle HV equipped with the power supply device shown in this figure includes vehicle body 91, engine 96 for driving vehicle body 91 and motor 93 for running, wheels 97 driven by engine 96 and motor 93 for running, power supply device 100 that supplies electric power to motor 93, and generator 94 that charges the battery of power supply device 100. Power supply device 100 is connected to motor 93 and generator 94 via DC/AC inverter 95. Vehicle HV runs by both motor 93 and engine 96 while charging and discharging the battery of power supply device 100. Motor 93 is driven to drive the vehicle in a region where the engine efficiency is low, that is, when accelerating or running at a low speed, for example. Motor 93 is driven by electric power supplied from power supply device 100. Generator 94 is driven by engine 96 or by regenerative braking for braking the vehicle, and charges the battery of power supply device 100. As shown in FIG. 13, vehicle HV may be provided with charging plug 98 for charging power supply device 100. By connecting charging plug 98 to an external power supply, it is possible to charge power supply device 100.

(Power Supply Device for Electric Vehicle)

Figure 14:
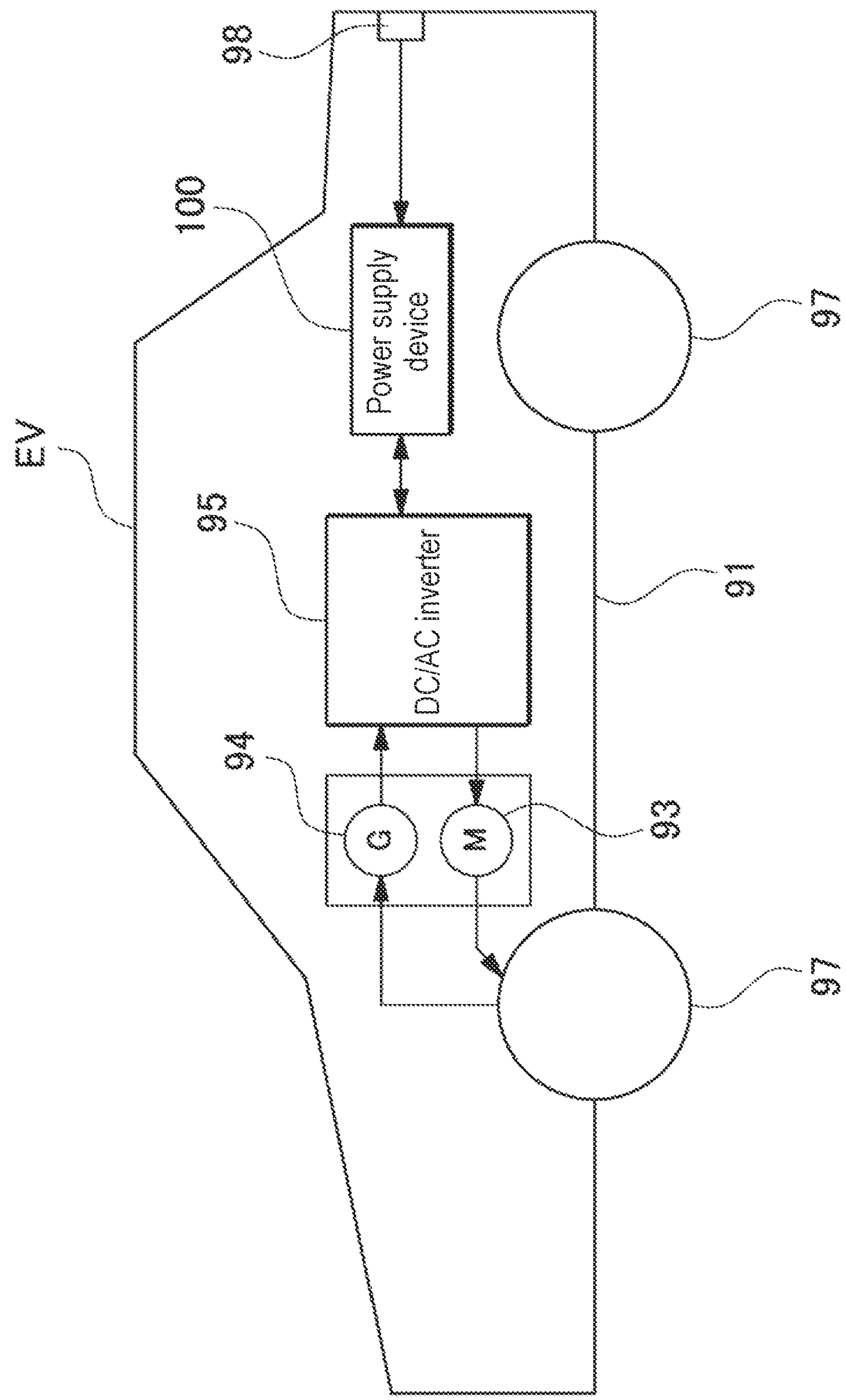
FIG. 14 is a block diagram showing an example in which the power supply device is mounted on an electric vehicle that travels only by a motor.

Further, FIG. 14 shows an example in which the power supply device is mounted on an electric vehicle that runs only by a motor. Vehicle EV equipped with the power supply device shown in this figure includes vehicle body 91, motor 93 for causing vehicle body 91 to run, wheels 97 driven by motor 93, power supply device 100 that supplies electric power to motor 93, and generator 94 that charges the battery of power supply device 100. Power supply device 100 is connected to motor 93 and generator 94 via DC/AC inverter 95. Motor 93 is driven by electric power supplied from power supply device 100. Generator 94 is driven by the energy used for regenerative braking of vehicle EV to charge the battery of power supply device 100. In addition, vehicle EV is equipped with charging plug 98, and charging plug 98 can be connected to an external power supply to charge power supply device 100.

(Power Storage System)

Figure 15:
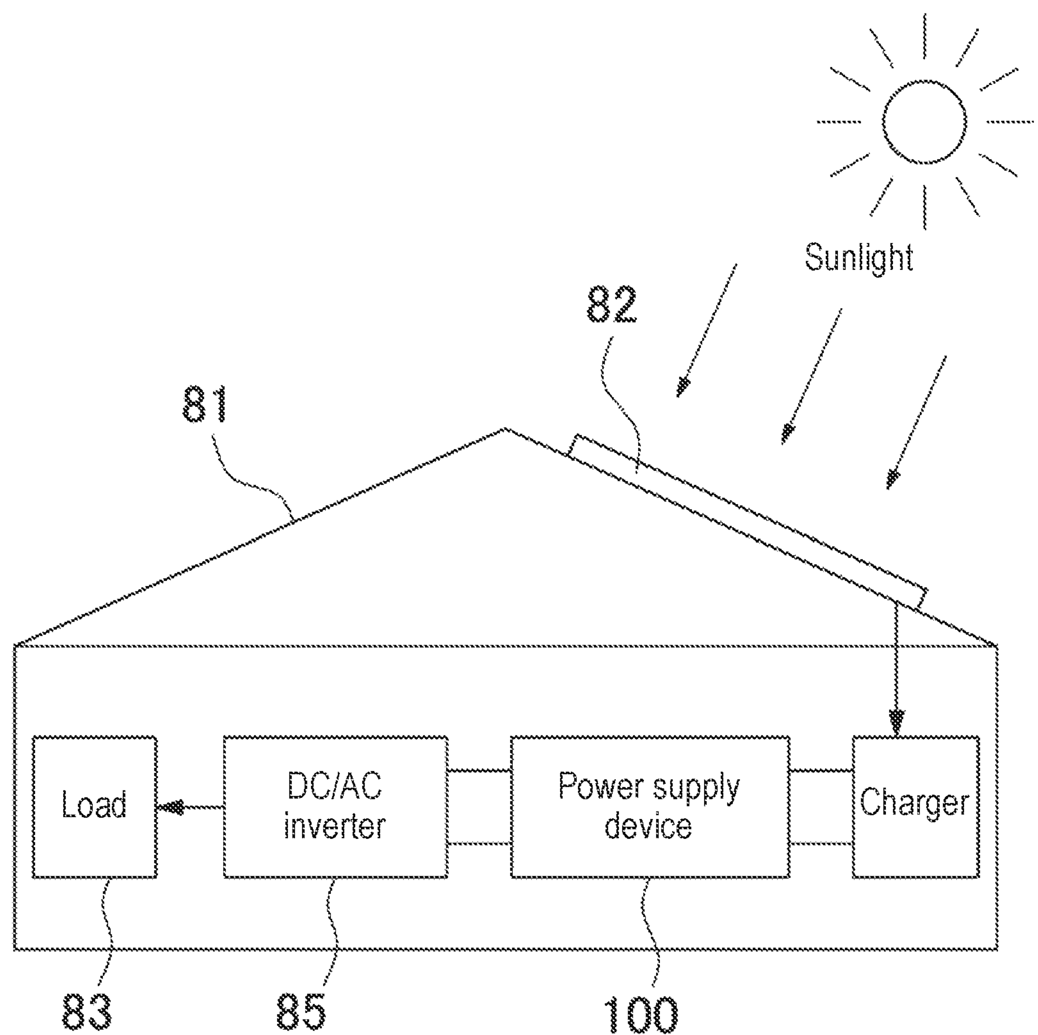
FIG. 15 is a block diagram showing an example applied to a power supply device for storing electricity.
Figure 16:
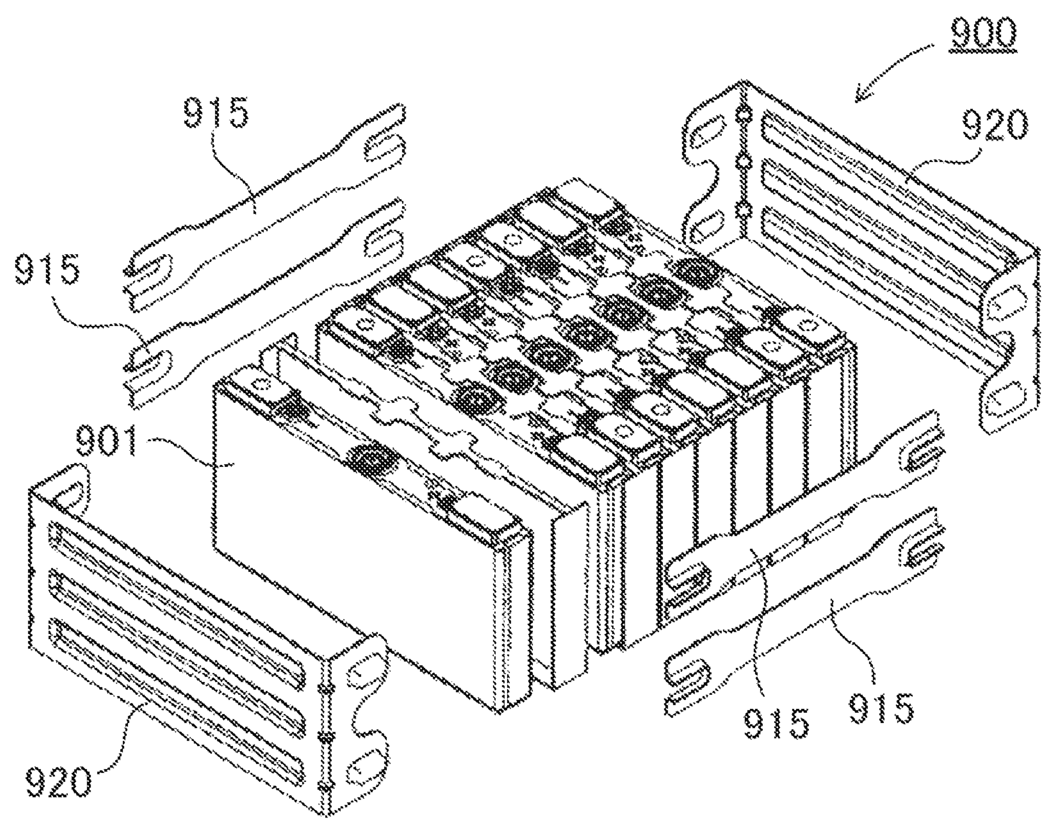
FIG. 16 is an exploded perspective view of a conventional power supply device.

Furthermore, the present invention does not specify the use of the power supply device as a power supply of a motor that drives a vehicle. The power supply device according to the exemplary embodiment can also be used as a power supply of a power storage system that charges a battery with electric power generated by solar power generation, wind power generation, or the like, and stores electricity. FIG. 15 shows a power storage system in which the battery of power supply device 100 is charged with a solar cell to store electricity. As shown in the figure, the power storage system shown in this figure charges the battery of power supply device 100 with electric power generated by solar cell 82 disposed on the roof or rooftop of building 81 such as a house or factory. Furthermore, the power storage system supplies electric power stored in power supply device 100 to load 83 via DC/AC inverter 85.

Further, although not shown, the power supply device can also be used as a power supply for a power storage system that charges a battery and stores electricity by using midnight power at night. The power supply device that is charged with the midnight power can be charged with the midnight power that is the surplus power of the power plant, output electric power during the daytime when the power load increases, and limit the peak power during the daytime to a small value. Furthermore, the power supply device can also be used as a power supply that is charged with both the power of the solar cell and the midnight power. The power supply device can effectively store electricity in consideration of weather and power consumption, by using both electric power generated by a solar cell and midnight power.

The power storage system as described above can be suitably used for a backup power supply device mountable on a computer server rack, a backup power supply device for a wireless base station for mobile phones or the like, a power supply for a power storage for home or factory use, a power storage device combined with a solar cell such as a power supply for street lights, a backup power supply for traffic lights and road traffic indicators, and the like.

INDUSTRIAL APPLICABILITY

A power supply device, a vehicle provided with the same, and a buffer, according to the present invention, can be preferably used as a power supply for a large current used for a power supply of a motor for driving an electrically driven vehicle such as a hybrid vehicle, a fuel cell vehicle, an electric vehicle, and an electric motorcycle. For example, a power supply device for a plug-in hybrid electric vehicle, a hybrid electric vehicle, an electric vehicle, or the like that can switch the traveling mode between an EV traveling mode and an HEV traveling mode, may be considered. In addition, they can also be used appropriately as a backup power supply mountable on a computer server rack, a backup power supply for a wireless base station for mobile phones or the like, a power storage device for home and factory use, a power storage device combined with a solar cell such as a power supply for street lights, a backup power supply for traffic lights, and the like.

REFERENCE MARKS IN THE DRAWINGS

100, 200 power supply device
1 secondary battery cell
1X terminal surface
1*a* exterior can
1*b* sealing plate
2 electrode terminal
3 bus bar
10 battery stack
15 fastening member
15*a* fastening main surface
15*b* bent portion
15*c* through hole
15*d* pressing part
16 insulating spacer
17 end spacer
20 end plate
30 buffer
31 cover
32 bottom plate
33 wall
34 connecting wall
35 bent piece
36 connecting part
40 plate
50 heat dissipation plate
52 heat conductive sheet
81 building
82 solar cell
83 load
85 DC/AC inverter
91 vehicle body
93 motor
94 generator
95 DC/AC inverter
96 engine
97 wheel
98 charging plug
900 power storage device
901 power storage element
915 bind bar
920 end plate
HV vehicle
EV vehicle

The invention claimed is:

1. A power supply device comprising:
a plurality of secondary battery cells;
a pair of end plates that covers both end faces of a battery stack in which the plurality of secondary battery cells are stacked;
a plurality of fastening members that fasten the pair of end plates to each other;
a plurality of pressing parts that press upper surfaces of the plurality of secondary battery cells respectively; and
a buffer interposed between the plurality of pressing parts and the upper surfaces of the plurality of secondary battery cells, wherein
the buffer includes:
a plurality of covers containing resin; and
a plurality of connecting parts having flexibility, one of the plurality of connecting parts configured to connect one of the plurality of covers and another one of the plurality of covers adjacent to the one of the plurality of covers, each of the plurality of covers is disposed on an upper surface of a corresponding one of the plurality of secondary battery cells,
each of the plurality of pressing parts abuts on an upper surface of a corresponding one of the plurality of covers,
each of the plurality of connecting parts is U-shaped, and
the one of the plurality of connecting parts is provided between the one of the plurality of covers and the another one of the plurality of covers.

2. The power supply device according to claim 1, wherein
the plurality of covers of the buffer and the plurality of connecting parts of the buffer are integrally formed.

3. The power supply device according to claim 1, wherein
the buffer further includes a plurality of plates made of metal in a plate shape,
each of the plurality of plates being disposed on the corresponding one of the plurality of covers, and
each of the plurality of covers is disposed on the upper surface of the corresponding one of the plurality of secondary battery cells, and
each of the plurality of pressing parts abuts on an upper surface of a corresponding one of the plurality of plates.

4. The power supply device according to claim 3, wherein
each of the plurality of covers includes a wall forming a U-shape along a periphery of the each of the plurality of covers in a plan view, and
each of the plurality of plates is disposed within the periphery of the corresponding one of the plurality of covers.

5. The power supply device according to claim 3, wherein
each of the plurality of plates has one or more holes defined therein.

6. The power supply device according to claim 3, wherein
each of the plurality of plates is integrally molded with the corresponding one of the plurality of covers.

7. The power supply device according to claim 3, wherein each of the plurality of plates is insert-molded in the corresponding one of the plurality of covers.

8. The power supply device according to claim 1, wherein each of the plurality of pressing parts has a curved portion that comes into contact with the upper surface of the corresponding one of the plurality of secondary battery cells.

9. The power supply device according to claim 8, wherein each of the plurality of pressing parts is integrally configured with a corresponding one of the plurality of fastening members.

10. The power supply device according to claim 9, wherein each of the plurality of fastening member includes a fastening main surface in a flat plate shape, and one of the plurality of pressing parts provided for each of the plurality of secondary battery cells, at an upper end of the fastening main surface.

11. The power supply device according to claim 1, further comprising a heat dissipation plate disposed on a bottom surface of the battery stack.

12. A vehicle comprising the power supply device according to claim 1, wherein the vehicle comprises the power supply device; a motor to which electric power is supplied from the power supply device; a vehicle body on which the power supply device and the motor are mounted, and a wheel driven by the motor to drive the vehicle body.

13. A buffer that covers an upper surface of a battery stack in which a plurality of secondary battery cells are stacked, the buffer being interposed between a pressing part that presses an upper surface of each of the plurality of secondary battery cells and the upper surface of the each of the plurality of secondary battery cells, the buffer comprising:

a plurality of covers containing resin;

a plurality of plates containing metal in a plate shape, the plurality of plates being disposed respectively on the plurality of covers; and a plurality of connecting parts having flexibility, one of the plurality of connecting parts configured to connect one of the plurality of covers and another one of the plurality of covers adjacent to the one of the plurality of covers, wherein one of the plurality of connecting parts is provided between the one of the plurality of covers and the another one of the plurality of covers.

* * * * *